US010588293B2

(12) United States Patent
Zimmerman

(10) Patent No.: US 10,588,293 B2
(45) Date of Patent: Mar. 17, 2020

(54) WET/DRY ANIMAL FEEDER

(71) Applicant: The GSI Group LLC, Assumption, IL (US)

(72) Inventor: Austin Dean Zimmerman, Lincoln, NE (US)

(73) Assignee: The GSI Group, LLC, Assumption, IL (US)

( * ) Notice: Subject to any disclaimer, the term of this patent is extended or adjusted under 35 U.S.C. 154(b) by 34 days.

(21) Appl. No.: 15/774,369

(22) PCT Filed: Nov. 10, 2016

(86) PCT No.: PCT/US2016/061357
§ 371 (c)(1),
(2) Date: May 8, 2018

(87) PCT Pub. No.: WO2017/087250
PCT Pub. Date: May 26, 2017

(65) Prior Publication Data
US 2019/0335706 A1  Nov. 7, 2019

Related U.S. Application Data

(60) Provisional application No. 62/255,588, filed on Nov. 16, 2015.

(51) Int. Cl.
*A01K 5/01* (2006.01)
*A01K 5/02* (2006.01)
*A01K 7/02* (2006.01)

(52) U.S. Cl.
CPC .............. *A01K 5/0225* (2013.01); *A01K 5/01* (2013.01); *A01K 5/0216* (2013.01); *A01K 7/02* (2013.01)

(58) Field of Classification Search
CPC ...... A01K 5/0225; A01K 5/01; A01K 5/0216; A01K 7/02
(Continued)

(56) References Cited

U.S. PATENT DOCUMENTS 4,147,132 A * 4/1979 Gilst .................... A01K 5/0225
119/53
4,444,151 A * 4/1984 Bohlmann ........... A01K 5/0241
119/53.5
(Continued)

FOREIGN PATENT DOCUMENTS

KR    2015 0067985 A    6/2015

OTHER PUBLICATIONS

European Patent Office, International Search Report for International Patent Application PCT/US2016/061357, dated Feb. 3, 2017.
(Continued)

*Primary Examiner* — Claude J Brown

(57) ABSTRACT

An animal feeder has a hopper for receiving feed, the hopper having converging front panels with lower ends defining an elongate chute through which feed is directed. A shield is attached to each of the front panels and diverges from the front panel forming a cove that remains free of feed. A trough extends along the feeder and a water supply duct delivers water into the trough. An elongate shelf has a feed platform for receiving feed from the hopper. The shelf is positioned above the trough such that any feed falling, falls into the trough. The shelf has shelf retainers running longitudinally of the shelf above the feed platform, each shelf retainer directed between its respective shield and front panel. A height-adjusting mechanism adjusts the vertical position of the shelf relative the hopper and the trough. As the shelf moves upward, the shelf retainer moves into the cove.

7 Claims, 7 Drawing Sheets

(58) Field of Classification Search
USPC .......................................................... 119/515
See application file for complete search history.

(56) References Cited

U.S. PATENT DOCUMENTS

| | | | | |
|---|---|---|---|---|
| 4,688,520 A * | 8/1987 | Parks | ............... | A01K 5/0275 119/51.11 |
| 4,790,266 A | 12/1988 | Kleinsasser et al. | | |
| 4,825,811 A * | 5/1989 | O'Kelley | ............ | A01K 5/0233 119/51.5 |
| 4,911,727 A * | 3/1990 | King | ............... | A01K 5/0216 119/51.5 |
| 5,010,849 A * | 4/1991 | Kleinsasser | ......... | A01K 5/0225 119/53 |
| 5,094,187 A * | 3/1992 | King | ............... | A01K 5/0241 119/51.5 |
| 5,255,632 A * | 10/1993 | Thomas | ............ | A01K 5/0225 119/51.5 |
| 5,603,285 A * | 2/1997 | Kleinsasser | ......... | A01K 5/0225 119/53 |
| 5,640,926 A * | 6/1997 | Kleinsasser | ......... | A01K 5/0225 119/53 |
| 5,967,083 A * | 10/1999 | Kleinsasser | ......... | A01K 5/0225 119/52.4 |
| 7,730,851 B2 | 6/2010 | Waldner et al. | | |
| 7,832,356 B2 * | 11/2010 | Kleinsasser | ......... | A01K 5/0225 119/51.11 |
| 7,975,648 B2 * | 7/2011 | Kleinsasser | ......... | A01K 5/0225 119/53 |
| 8,939,109 B2 * | 1/2015 | Kleinsasser | ......... | A01K 5/0225 119/53.5 |
| 9,603,339 B2 * | 3/2017 | Di Nello | ............ | A01K 5/0225 |
| 2003/0111018 A1 * | 6/2003 | Bondarenko | ....... | A01K 5/0225 119/53.5 |
| 2008/0276873 A1 * | 11/2008 | Waldner | ............ | A01K 5/0216 119/51.5 |
| 2014/0197206 A1 * | 7/2014 | Jansen | ............... | A01K 39/012 222/185.1 |

OTHER PUBLICATIONS

UK Intellectual Property Office, International Search Report from related UK Application No. GB1521421.6, dated May 17, 2016.

* cited by examiner

WET/DRY ANIMAL FEEDER

CROSS REFERENCE TO RELATED APPLICATION

This application claims the benefit of U.S. Provisional Application No. 62/255,588 filed Nov. 16, 2015, which is hereby incorporated by reference in its entirety.

BACKGROUND OF THE INVENTION

Field of Invention

This invention relates generally to animal feeders, and more particularly to wet/dry feeders for swine production.

Description of Related Art

There is an increasing demand for efficiency in swine production. Desirably, the hogs are supplied with food so that they eat as much and as quickly as possible so as to reach the required weight and be shipped to market within the shortest possible time. To this end it is desirable to supply the pigs with feed in whatever condition they desire so they take as much as they can without in any way being inhibited from eating further.

In recent years there have been products on the market for providing feed to pigs in both a dry condition and a wet condition. U.S. Pat. No. 4,790,266 discloses such a feeder unit that uses a trough and a shelf positioned above the trough with a water supply duct beneath the shelf for directing water through valves actuated by the hog. A hopper positioned above the shelf directs material continuously onto the shelf. The hog can thus either eat the feed in dry condition directly from the shelf or can brush the feed into the trough for mixing with water and eating in a wet condition. Using wet/dry feeders to feed hogs a wet feed mixture is a proven, viable solution to get increased growth production.

However, currently available wet/dry feeders restrict the full potential of the proven wet/dry feeding concept. Typically, these feeders have only a single adjustment capable of minimal height adjustment and they cannot be adjusted with feed inside. Additionally, these feeders have a single feed mixture in a common trough space.

OVERVIEW OF THE INVENTION

In one aspect, the invention is directed to a feeder for animals. The feeder has a hopper for receiving feed, the hopper having a pair of end panels and a pair of sidewalls, the sidewalls having downwardly and inwardly converging front panels with lower ends thereof defining an elongate chute along a length of the hopper through which feed received into the hopper is directed. The hopper further has a urine shield attached to each of the front panels at a position above the lower end, wherein the urine shield diverges from the front panel forming a cove that remains free of feed passing downward through the chute. The feeder also has an elongate trough that receives feed and water. A water supply duct extends longitudinally of the trough and has a plurality of actuation nipples that can be actuated to deliver water into the trough. The feeder has an elongate shelf extending substantially along a full length of the trough. The shelf has a feed platform with at least one horizontal plate for receiving feed from the hopper. The shelf is positioned above the trough such that any feed falling therefrom along the length thereof falls vertically downwardly into the trough.

In one aspect, the shelf has a pair of shelf retainers running longitudinally of the shelf above the feed platform, each shelf retainer having an upward outward slope with an upper portion directed between its respective urine shield and front panel. The feeder has a height-adjusting mechanism configured to adjust the vertical position of the shelf relative the hopper and the trough. As the shelf is moved upward relative the hopper from a low shelf position to a high shelf position, each shelf retainer moves into its respective cove between the urine shield and the front panel.

In one aspect, the feeder has a pair of movable gates, with one moveable gate on either side of the feeder to control the size of an opening between the shelf retainer and the feed platform. Each gate is movable in a vertical direction to increase or decrease the size of the opening.

These and other features and advantages of this invention are described in, or are apparent from, the following detailed description of various exemplary embodiments of the systems and methods according to this invention.

BRIEF DESCRIPTION OF THE DRAWINGS

The above mentioned and other features of this invention will become more apparent and the invention itself will be better understood by reference to the following description of embodiments of the invention taken in conjunction with the accompanying drawings, wherein.

Corresponding reference characters indicate corresponding parts throughout the views of the drawings.

DETAILED DESCRIPTION OF EXEMPLARY EMBODIMENTS

The invention will now be described in the following detailed description with reference to the drawings, wherein preferred embodiments are described in detail to enable practice of the invention. Although the invention is described with reference to these specific preferred embodiments, it will be understood that the invention is not limited to these preferred embodiments. But to the contrary, the invention includes numerous alternatives, modifications and equivalents as will become apparent from consideration of the following detailed description.

Figure 1:
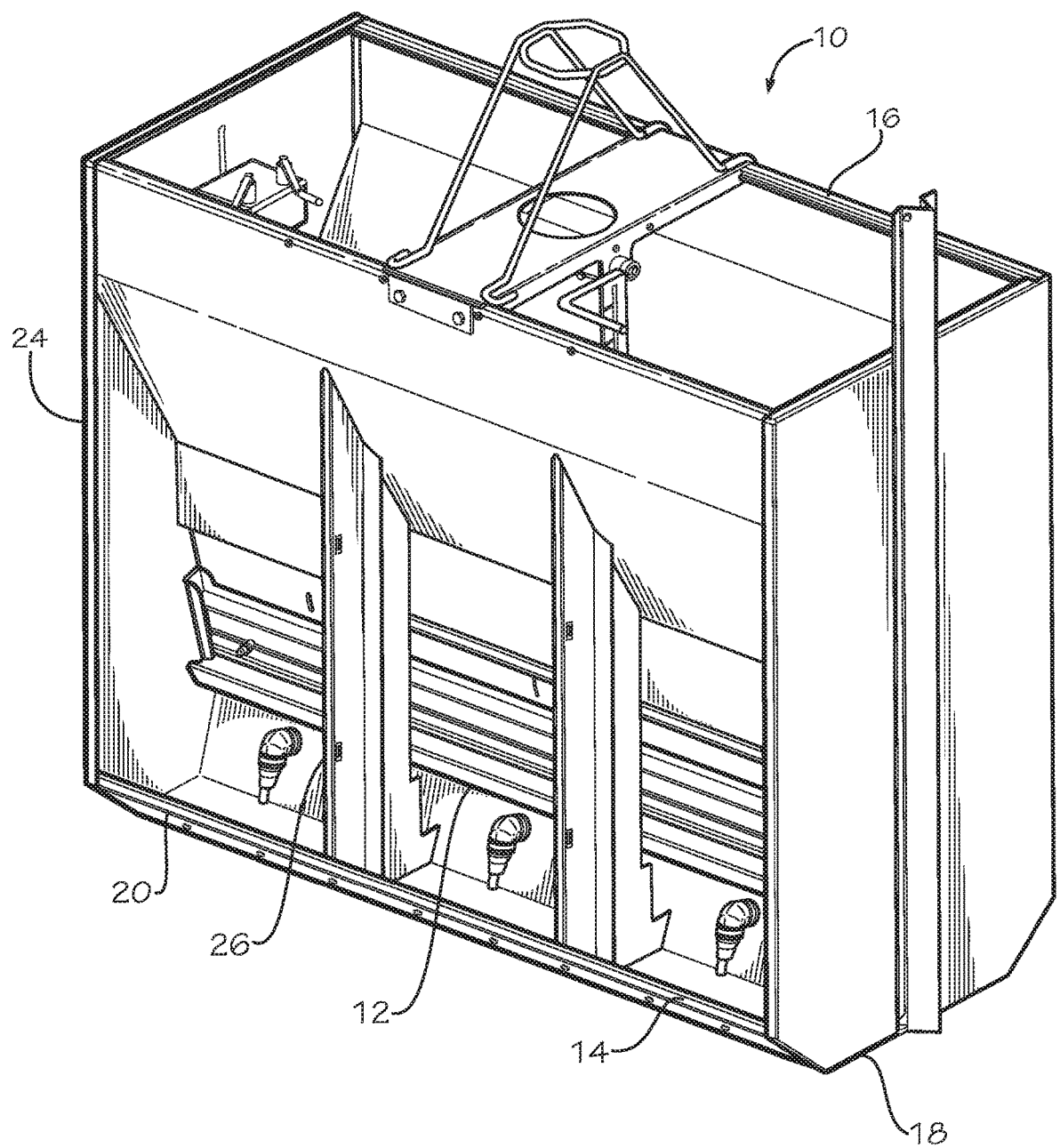
FIG. 1 is an isometric view of a feeder according to the invention.
Figure 2:
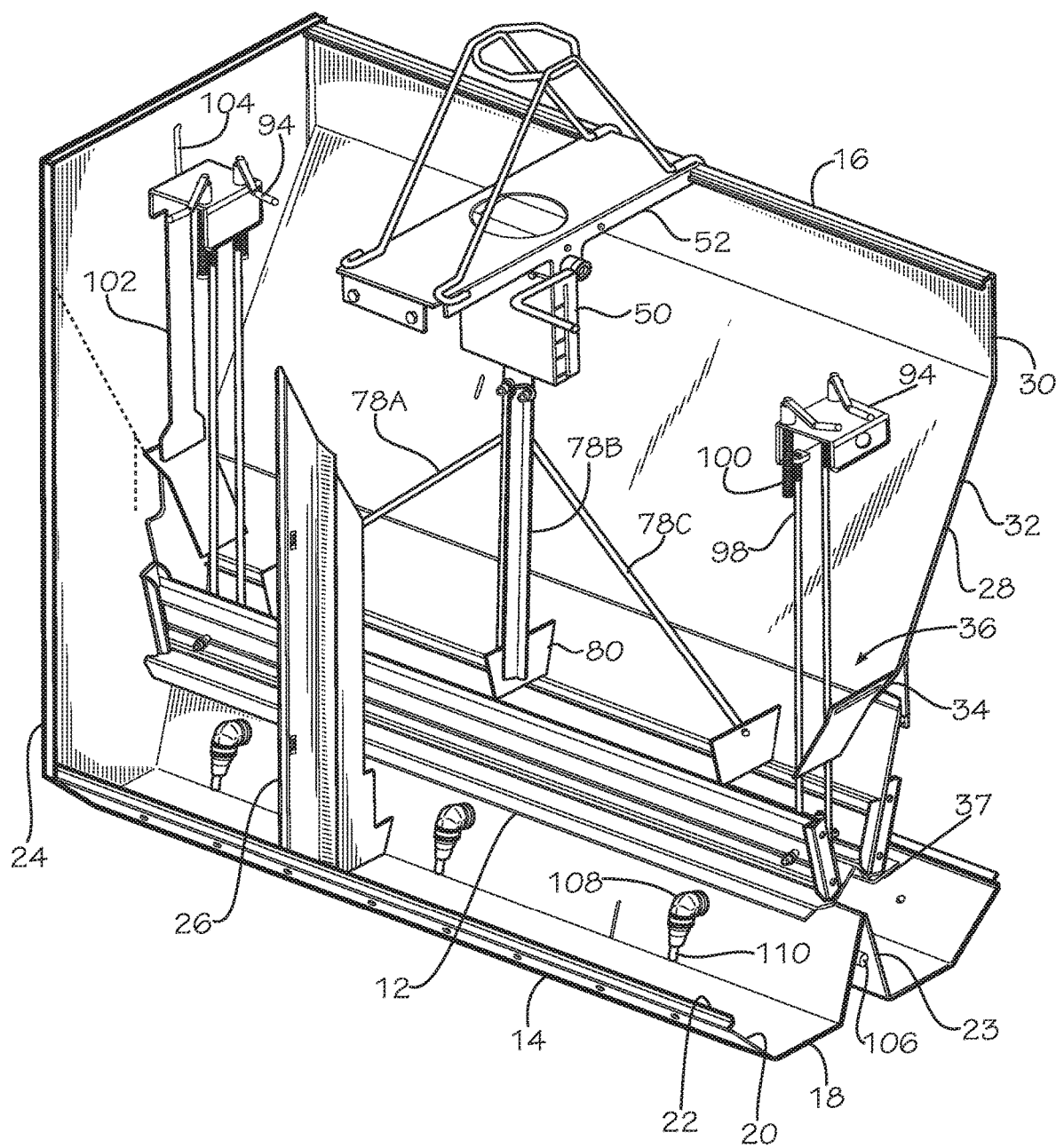
FIG. 2 is a cut-away view of a portion of the feeder of FIG. 1.

FIG. 1 illustrates a wet and dry feeder 10 for animals and particularly suited for hogs in which the feed is deposited onto a shelf 12 accessible by the hog and positioned above a trough 14 so that feed is available in a dry condition on the shelf 12 and can be moved by the hog to the trough 14 for mixing with water and eating in a wet condition. A hopper 16 is located above the shelf 12 for depositing the feed on the shelf 12. Turning also now to FIG. 2, the trough 14 has a base 18 for resting on the floor of an animal pen and a pair of sidewalls 20 which are inclined upwardly and outwardly so that the trough 14 defines a receptacle for water and feed. An upper lip 22 of the sidewalls 20 is turned over so as to avoid the presentation of a raw edge to the hogs and also to provide strength to the sidewalls 20. A center portion 23 of the trough base 18 is bent in an inverted V-shape to force the water and feed outward. The trough 14 is desirably accessible to hogs from either side of the feeder 10.

The trough 14 comprises a pair of end panels 24 which close the ends of the trough 14 and also extend upwardly to define the ends of the hopper 16. In between the end panels 24 on either side of the trough 14 is a plurality of dividers 26 forming separate feeding stations from which hogs can reach the shelf 12 for taking dry feed or the trough 14 for taking wet feed.

The hopper 16 is formed with sidewalls 28 having generally vertical upper panels 30 and downwardly and inwardly converging front panels 32. Desirably, the ends of the upper panels 30 and front panels 32 are welded to the end panels 24 to form a generally rectangular hopper 16 when looking from above. The front panels 32 converge inwardly such that lower ends 34 of the front panels 32 define an elongate chute 36 along the length of the hopper 16 and ensure that material fed into the hopper 16 falls gradually through the chute 36.

As best seen in the cut-away view of FIG. 2, the shelf 12 is mounted beneath the chute 36 and comprises a feed platform 37 having pair of substantially horizontal plates 38 with parallel outer edges 40 extending longitudinally thereof and spaced outwardly of the chute 36. At each of the edges 40, the feed platform 37 is turned slightly upwardly to form a slight dish structure. A center portion 42 of the feed platform 37 is bent in an inverted V-shape to force the feed outward to the horizontal plates 38 of the shelf 12. The shelf 12 is desirably accessible to hogs from either side of the feeder 10.

A urine shield 44 is attached to each front panel 32 and extends downward in a generally vertical or slightly outward sloping condition such that a lower edge 46 of the urine shield 44 is at least even with or slightly outward the outer edge 40 of the shelf 12 below it.

Figure 3:
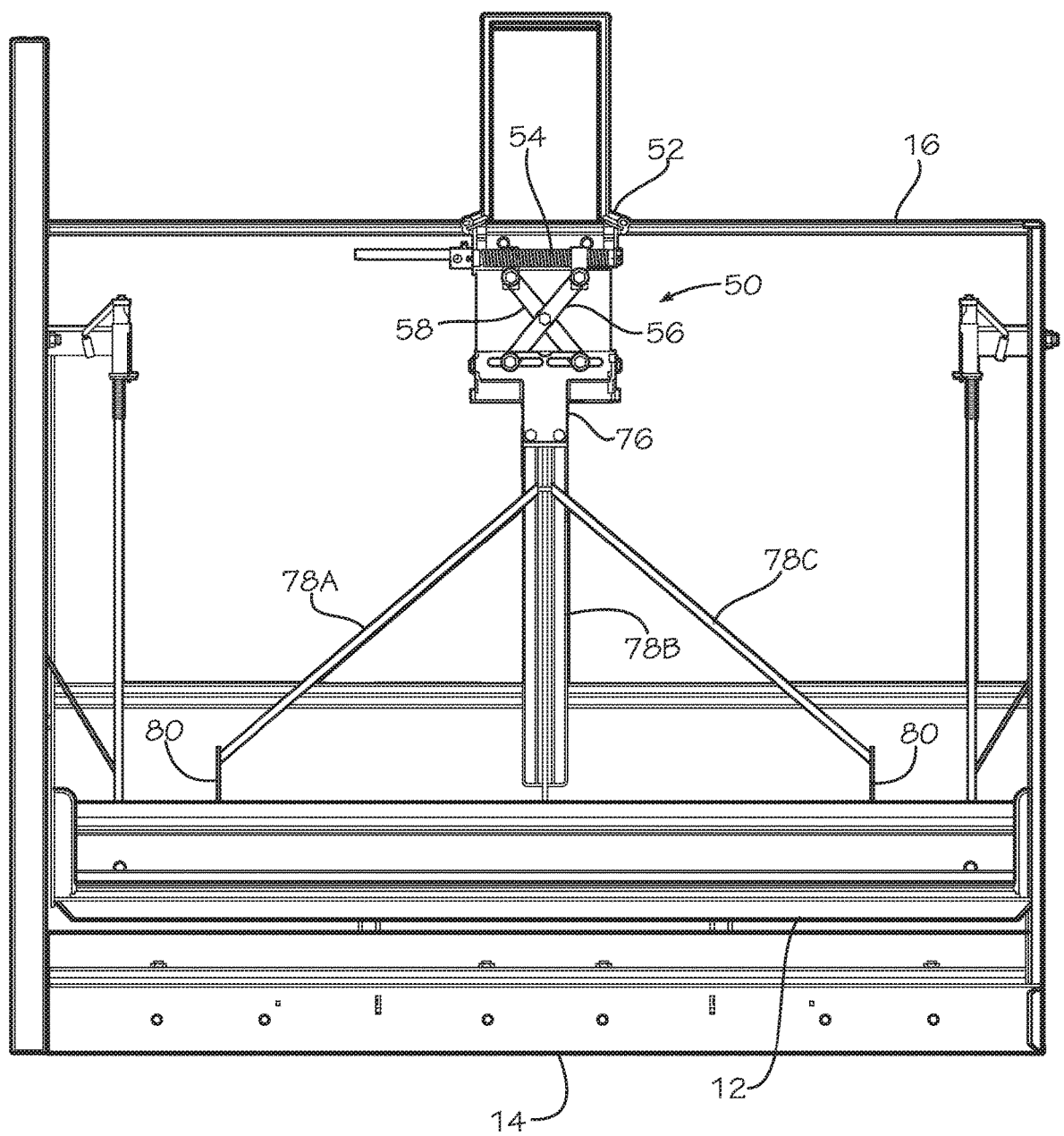
FIG. 3 is a side view of the feeder of FIG. 1.
Figure 4:
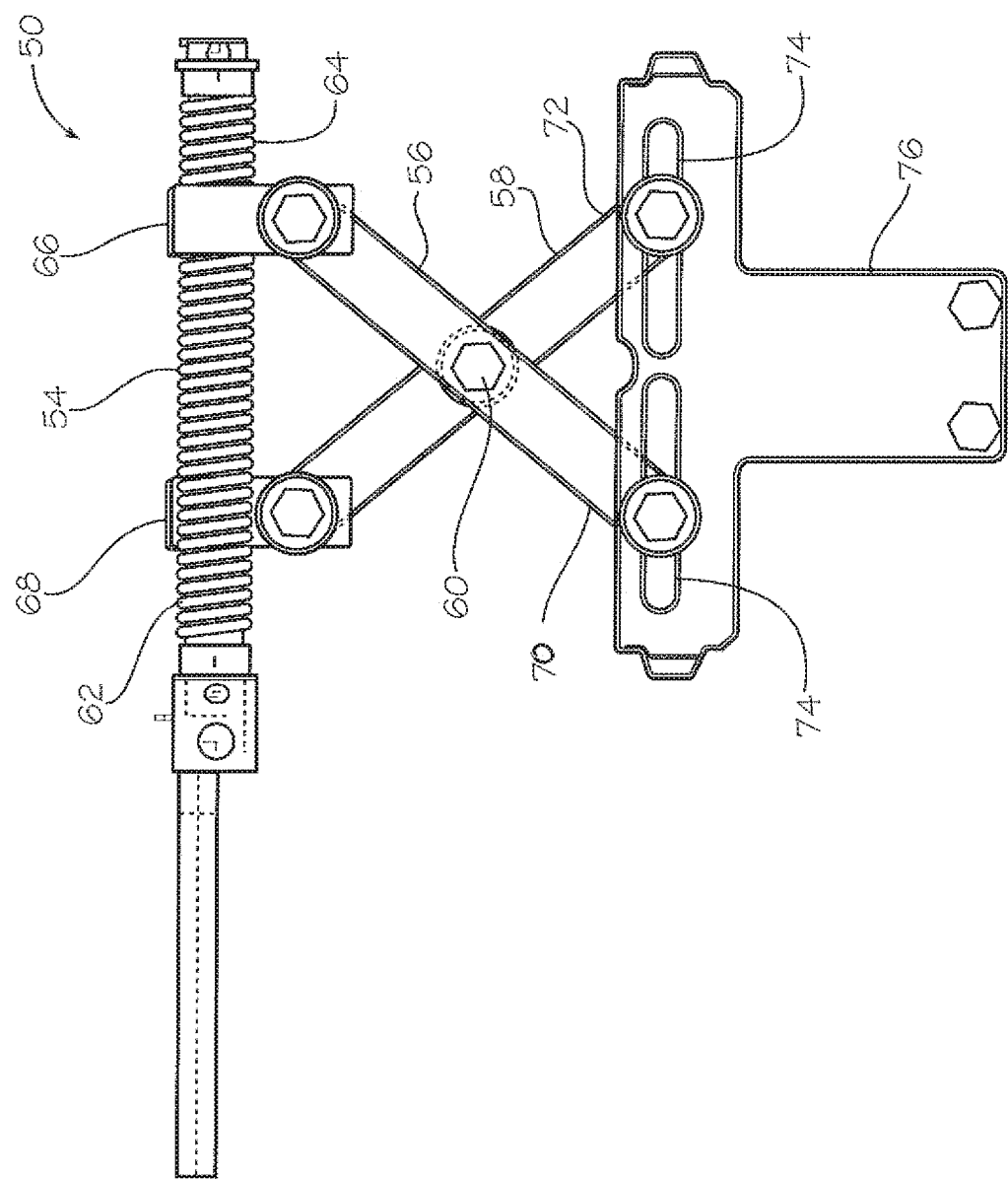
FIG. 4 is an enlarged view of the height-adjusting mechanism of the feeder of FIG. 3.

Turning now to FIG. 3, the shelf 12 is carried by a height-adjusting mechanism 50 used to adjust the vertical position of the shelf 12 relative the hopper 16 and the trough 14. The height-adjusting mechanism 50 is mounted on a bracket 52 attached to the upper panels 30 of the hopper 16. In one embodiment, the height-adjusting mechanism 50 is a scissor lift mechanism having a threaded rod 54 and first and second diagonal linkages 56, 58 crossed and pivotally coupled at a cross point with pin 60. In one embodiment, the threaded rod 54 is a dual-threaded Acme rod having a first end 62 with right-handed threads and a second end 64 with left-handed threads. As best seen in the enlarged view of FIG. 4, a first threaded mount 66 at an upper end of the first diagonal linkage 56 is threadingly engaged to the threads on the first end 62 of the threaded rod 54 and a second threaded mount 68 at an upper end of the second diagonal linkage 58 is threadingly engaged to the threads on the second end 64 of the threaded rod 54. Lower ends 70, 72 of the first and second diagonal linkages 56, 58 are slidably received in slots 74 of a hanger 76.

Rotation of the threaded rod 54 causes opposing movement of the first and second threaded mounts 66, 68 threadingly engaged on the rod thereby pivoting the diagonal linkages 56, 58 about the cross point to either raise or lower the hanger 76 with respect to the hopper 16. A plurality of straps 78A, 78B, 78C connects the shelf 12 to the hanger 76 so that the height-adjusting mechanism 50 controls vertical movement of the shelf 12 to adjust the spacing between the chute 36 and the shelf 12 and the spacing of the shelf 12 above the trough 14. In the illustrated embodiment, the straps 78A, 78B, 78C connect to mounting plates 80 attached to the shelf 12. Diagonal straps 78A, 78C attach near opposing ends of the shelf 12 so that the shelf 12 can be raised or lowered without tipping to reduce spillage of any feed on the shelf 12 when raising or lowering the shelf 12. Desirably, the mechanical advantage provided by the shelf-lifting mechanism 50 allows the shelf 12 to be adjusted with feed on the shelf 12.

Figure 5A:
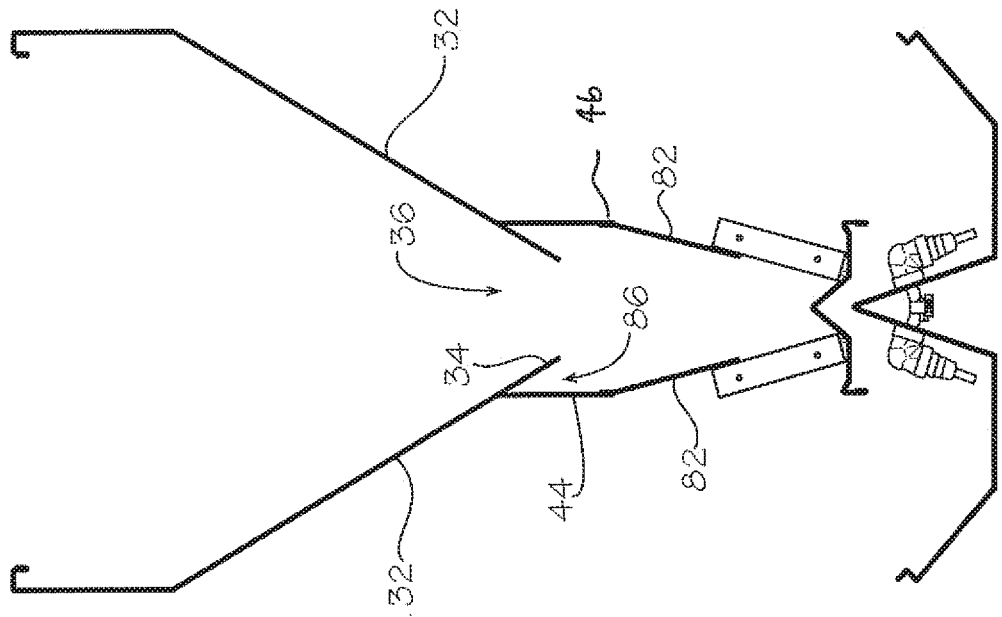
FIGS. 5A and 5B are end views of the shelf of the feeder in a high and a low shelf position.
Figure 5B:
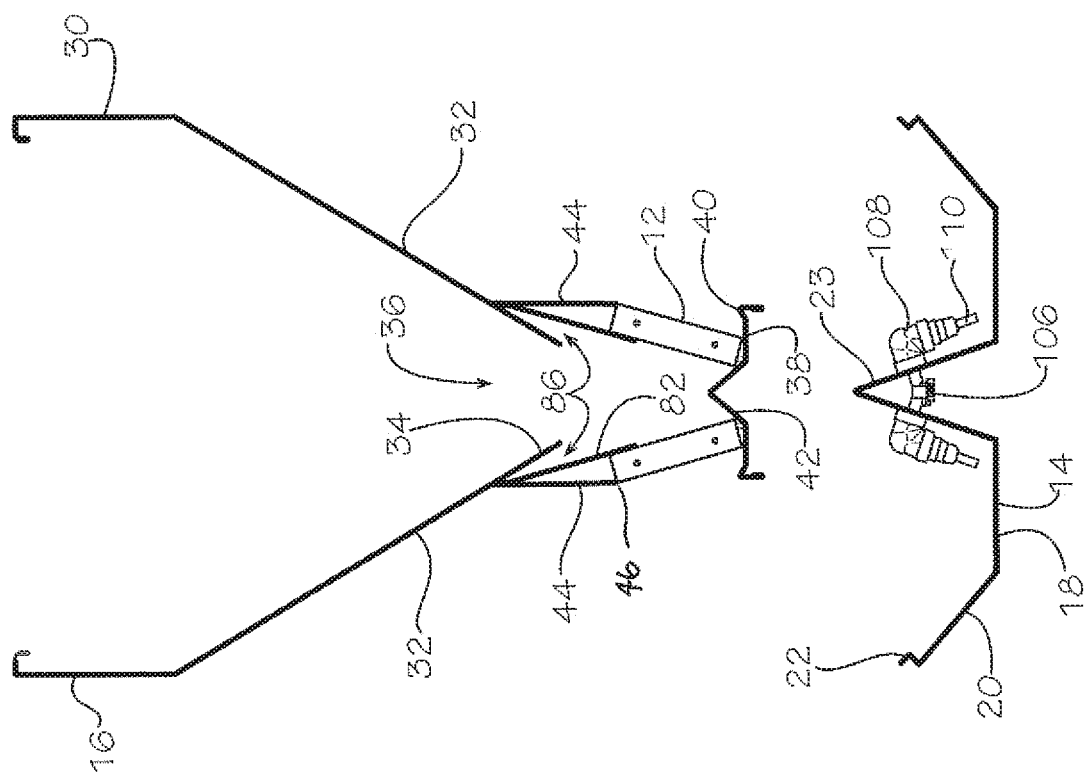
Figure 6:
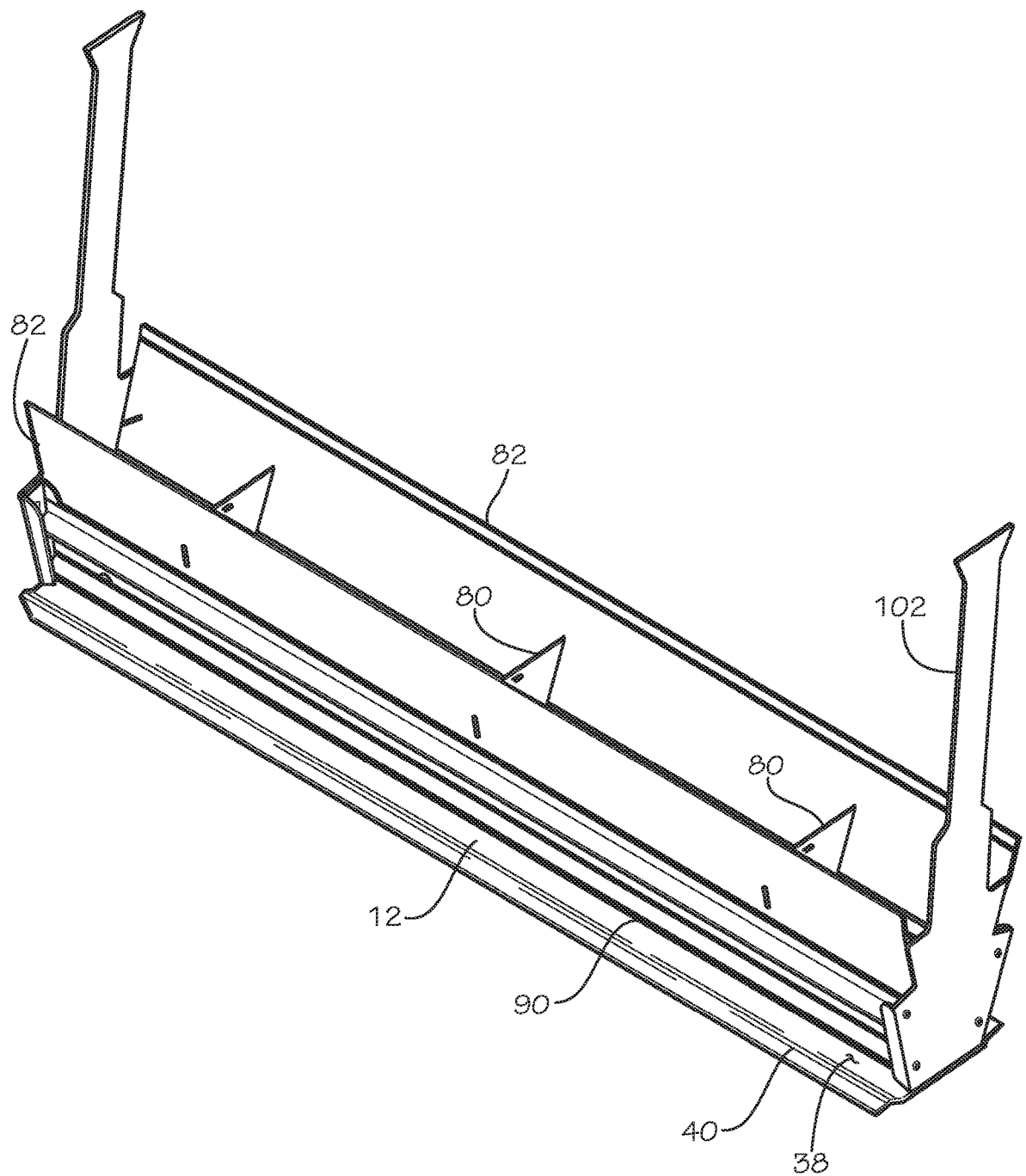
FIG. 6 is an isometric view of a shelf of the feeder of FIG. 1.

Turning also now to FIGS. 5A, 5B and 6, the shelf 12 has a pair of shelf retainers 82 running longitudinally of the feeder 10 above the plates 38. Each shelf retainer 82 has an upward outward slope with an upper portion 84 that tucks under the urine shield 44 but is outward of the front panel 32. The urine shield 44 is attached to the front panel 32 at a position above the lower end 34 thereof and diverges from the front panel 32 forming a sheltered cove 86 that remains free of feed passing downward through the chute 36. As the shelf 12 is moved upward relative the hopper 16 from a low shelf position as shown in FIG. 5B to a high shelf position as shown in FIG. 5A, the shelf retainer 82 moves into the cove 86 between the urine shield 44 and the front panel 32. As the chute 36 and shelf retainer 82 direct feed from the hopper 16 away from the cove 86, feed does not accumulate in the cove 86 and thereby block any upward moving shelf retainer 82 and impede upward movement of the shelf. Thus, the cove 86 provides an open space into which the shelf retainer 82 may move when raised.

Figure 7:
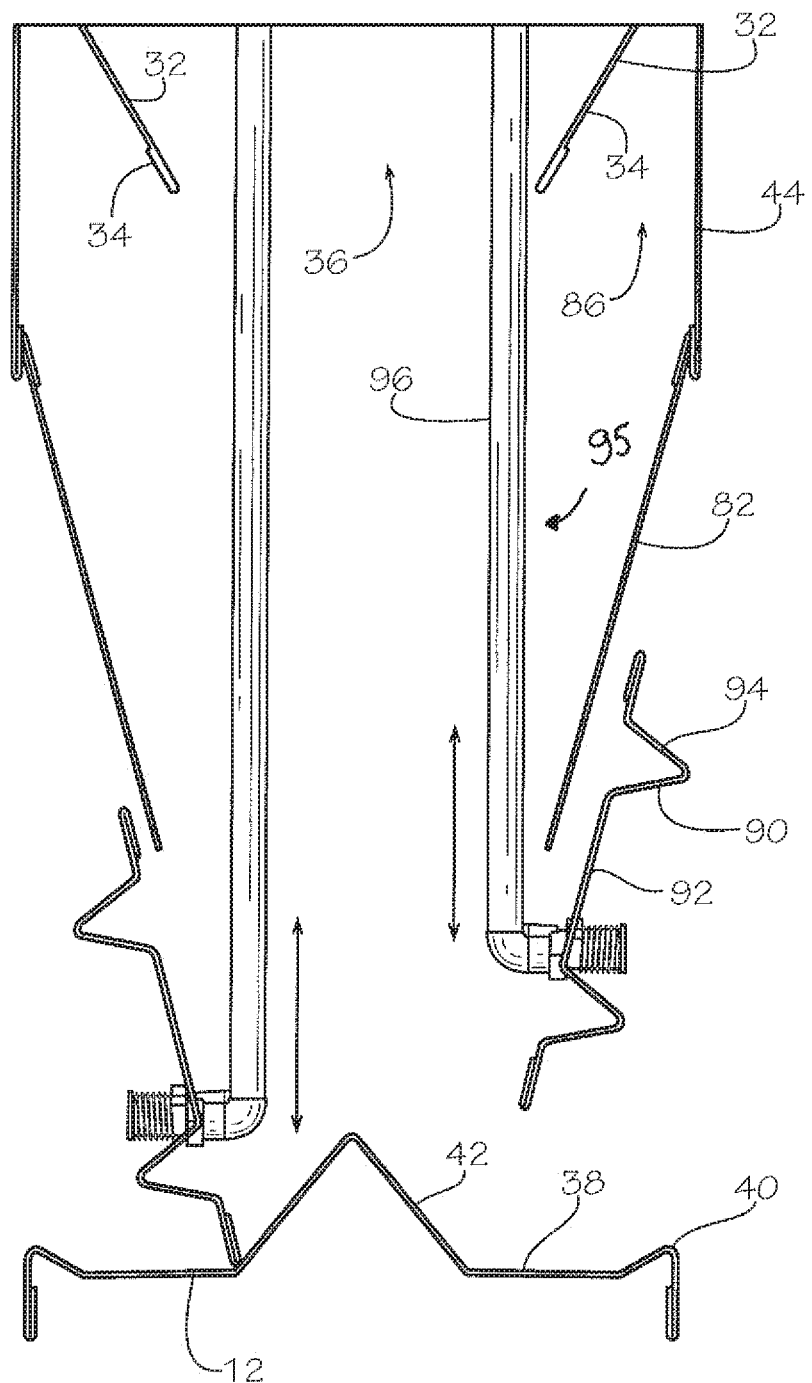
FIG. 7 is a cross-sectional view of the shelf.

Turning now to FIG. 7, moveable gates 90 on either side of the feeder 10 control the size of the opening between the shelf retainer 82 and the feed platform 37. Each gate 90 is movable in a vertical direction to increase or decrease the size of the opening to allow the producer to fine-tune the feeder 10 to release the optimal amount of feed onto the shelf 12 for the age of the hogs. The gates 90 extend along the longitudinal length of the shelf 12, and in the illustrated embodiment, each gate 90 has a base surface 92 which is substantially parallel with the shelf retainer 82 so that as the gate 90 is raised vertically, the gate 90 slides along the outside of the shelf retainer 82. Desirably, the gate 90 has one or more agitators 94 which help prevent clogging of the feed at the opening as the gate 90 is moved up and down.

A gate-opening mechanism 95 is connected to the gate 90 to raise and lower the gate 90. In one embodiment, the gate-opening mechanism 95 controls each gate 90 individually so that the gates 90 can be raised or lowered individually and to a differing height. In the illustrated embodiment, the gate-opening mechanism 95 has a height adjusting connecting rod 96 connected to each gate 90. As best seen in FIG. 2, the height adjusting rod 96 has an upper portion 98 threadingly engaged with a lead-screw 100 used to raise and lower the rod 96. The gate-opening mechanism 94 is mounted to the shelf 12 such that the gate-opening mechanism 95 moves up or down with movement of the shelf 12 so that the position of the gate 90 relative the shelf retainer 82 does not change with vertical movement of the shelf 12. In the illustrated embodiment, the gate-opening mechanism 94 connects to end members 102 of the shelf 12 which interact with guide slots 104 in the end panels 24 of the hopper 16.

A water supply duct 106 extends longitudinally of the trough 14 a short distance beneath the center portion 23 of the trough 14. The water supply duct 106 receives water from a supply through conventional means and carries a plurality of valves 108 each of which extend through the trough 14 and includes an actuation nipple 110 which projects downwardly into the dish portion of the trough 14.

The actuation nipple 110 is biased into a closed position but can be actuated by a hog's snout so that water flows into the trough 14. The details of the valve 108 are well known in the art and commercially available.

In operation, feed is deposited into the hopper 16 and falls continuously and unencumbered onto the shelf 12 and particularly the plate 38 to flow outwardly toward the edge 40 of the shelf 12. The distance between the gate 90 and the feed platform 37 can be adjusted by operation of the gate-opening mechanism 95 to accommodate different flow characteristics of different feeds and the feeding requirements of the hogs. The height of the shelf 12 can also be adjusted based on the size of the hogs. When the feed is positioned on the shelf 12, it can be taken directly by a hog. If the hog prefers, it can use its snout to brush feed from the shelf 12 over the edge 40 into the trough 14 for eating from the trough 14. Water can be added to the trough 14 through the nipple 110 and thus the feed in the trough 14 will generally be in a wet condition. The hog can add water to the feed by actuating the nipple 110.

The foregoing has broadly outlined some of the more pertinent aspects and features of the present invention. These should be construed to be merely illustrative of some of the more prominent features and applications of the invention. Other beneficial results can be obtained by applying the disclosed information in a different manner or by modifying the disclosed embodiments. Accordingly, other aspects and a more comprehensive understanding of the invention may be obtained by referring to the detailed description of the exemplary embodiments taken in conjunction with the accompanying drawings.

The invention claimed is:

1. A feeder for animals comprising:
   a hopper for receiving feed, the hopper comprising a pair of end panels and a pair of sidewalls, the sidewalls having downwardly and inwardly converging front panels with lower ends thereof defining an elongate chute along a length of the hopper through which feed received into the hopper is directed, the hopper further comprising a urine shield attached to each of the front panels at a position above the lower end, wherein the urine shield diverges from the front panel forming a cove that remains free of feed passing downward through the chute;
   an elongate trough for receiving and containing feed and water;
   a water supply duct extending longitudinally of the trough having a plurality of actuation nipples that can be actuated to deliver water into the trough;
   an elongate shelf extending substantially along a full length of the trough and comprising a feed platform having at least one horizontal plate for receiving feed from said hopper, said shelf being arranged above said trough such that any feed falling therefrom along the length thereof falls vertically downwardly into the trough, the shelf having a pair of shelf retainers running longitudinally of the shelf above the feed platform, each shelf retainer having an upward outward slope with an upper portion directed between its respective urine shield and front panel; and
   a height-adjusting mechanism configured to adjust the vertical position of the shelf relative the hopper and the trough, wherein as the shelf is moved upward relative the hopper from a low shelf position to a high shelf position, each shelf retainer moves into its respective cove between the urine shield and the front panel.

2. The feeder of claim 1 further comprising a pair of movable gates, with one moveable gate on either side of the feeder to control the size of an opening between the shelf retainer and the feed platform, wherein each gate is movable in a vertical direction to increase or decrease the size of the opening.

3. The feeder of claim 2 wherein each gate extends along the longitudinal length of the shelf and has a base surface which is substantially parallel with the shelf retainer so that as the gate is raised vertically, the gate slides along the outside of the shelf retainer.

4. The feeder of claim 3 wherein each gate has one or more agitators to help prevent clogging of the feed at the opening as the gate.

5. The feeder of claim 2 further comprising a gate-opening mechanism connected to each of the gates to raise and lower the gate, wherein the gate-opening mechanism is mounted to the shelf such that the gate-opening mechanism moves up or down with movement of the shelf so that the position of the gate relative the shelf retainer does not change with vertical movement of the shelf.

6. The feeder of claim 1 wherein the height-adjusting mechanism is a scissor lift mechanism having a threaded rod and first and second diagonal linkages crossed and pivotally coupled at a cross point and threadingly connected to the threaded rod, the threaded rod having a first end with right-handed threads and a second end with left-handed threads, wherein lower ends of the first and second diagonal linkages are slidably received in slots of a hanger connected to the shelf.

7. The feeder of claim 6 wherein a first threaded mount at an upper end of the first diagonal linkage is threadingly engaged to the threads on the first end of the threaded rod and a second threaded mount at an upper end of the second diagonal linkage is threadingly engaged to the threads on the second end of the threaded rod such that rotation of the threaded rod causes opposing movement of the first and second threaded mounts threadingly engaged on the rod thereby pivoting the diagonal linkages about the cross point to either raise or lower the hanger with respect to the hopper.

* * * * *